United States Patent [19]

Zanker et al.

[11] Patent Number: 5,063,776
[45] Date of Patent: Nov. 12, 1991

[54] METHOD AND SYSTEM FOR MEASUREMENT OF FLUID FLOW IN A DRILLING RIG RETURN LINE

[75] Inventors: Klaus J. Zanker, Houston; Jacques Orban, Sugar Land, both of Tex.

[73] Assignee: Anadrill, Inc., Sugar Land, Tex.

[21] Appl. No.: 450,807

[22] Filed: Dec. 14, 1989

[51] Int. Cl.$^5$ .............................................. G01F 1/66
[52] U.S. Cl. ........................................ 73/155; 73/151; 73/861; 73/3
[58] Field of Search ...................... 73/3, 155, 215, 151, 73/290 V, 861, 53; 364/422

[56] References Cited

U.S. PATENT DOCUMENTS 4,735,097 4/1988 Lynnworth ...................... 73/290 V
4,787,240 11/1988 McShane .......................... 73/290 V Primary Examiner—Hezron E. Williams
Assistant Examiner—Craig Miller
Attorney, Agent, or Firm—David P. Gordon; John J. Ryberg

[57] ABSTRACT

Improved methods and systems are provided for determining a volumetric flow rate of mud in a return line without the aid of a velocity probe. A mud level sensor is located in a return line chimney preferably in close proximity to the bell nipple. The sensor senses the height of the mud flowing in the return line. Where an ultraonsic transceiver is used as the sensor, temperature sensors in the chimney and return line determine a temperature gradient in the return line which provides a speed of sound correction as does a target at a known distance from the transceiver. A computer receives the uncorrected mud height and the speed of sound information, and determines the flow-out volume of the mud. Flow-out volume is related to the mud height, the geometry of the return line, and mud parameters. In a more complete system, the computer calibrates the determined flow-out volume with the flow-in volume, and provides a correction factor which is used to provide a corrected flow-out determination. The computer also monitors delta flow (flow-out minus flow-in), and based on the rate of change of delta flow determines when an undesirable condition such as a kick or fluid loss occurs. Where the system is to be used on rig which is subject to movement (e.g. a floating rig), an angle sensor is employed to help determine instantaneous flow-out, and the flow-out determinations are averaged over the movement cycle of the rig as determined by heave position sensors available on the rig.

33 Claims, 7 Drawing Sheets

METHOD AND SYSTEM FOR MEASUREMENT OF FLUID FLOW IN A DRILLING RIG RETURN LINE

BACKGROUND OF THE INVENTION

1. Field of the Invention

This invention relates generally to the field of measuring the volumetric flow rate of a fluid. More particularly, the invention relates to a method and system for measuring the volumetric flow rate of a fluid in a drilling rig return line.

2. Description of the Prior Art

Well control and blowout prevention have become important concerns in the oil and gas drilling industry for a number of reasons. Well blowouts cause higher drilling costs, possible loss of life, and waste of natural resources. An additional reason for concern is the increasing number of governmental regulations and restrictions being placed on offshore drilling operations partially as a result of recent, much-publicized well control incidents.

A kick can be defined as a well control problem in which the pressure found within the drilled formation is greater than the mud or fluid hydrostatic pressure acting on the borehole or face of the formation. This formation pressure causes fluids to flow from the formation into the well bore. In almost all drilling operations, the operator attempts to maintain a hydrostatic pressure greater than the formation pressure and thus prevent kicks. On occasion, however, and for various reasons, the formation pressure exceeds the mud pressure and a kick will occur. Kicks have become even more common due to the present trend of increasing drilling rates by using lighter drilling mud.

Another problem encountered when drilling a well is drilling fluid loss into the formation. This problem, known by the shorthand term, "Lost Circulation", occurs where the drilling fluid is flowing into a subterranean formation through which the borehole passes. Such condition should be detected quickly by a driller to prevent damage to such a formation and excessive loss of the drilling fluid.

A number of kick or lost circulation "indicators" can be observed at the surface before a kick has had time to result in a dangerous blowout or excessive time has elapsed since the beginning of lost circulation. Three of these are:

FLOW RATE CHANGE - An increase in the flow-out or flow rate leaving the well while pumping at a constant rate is one of the primary kick indicators. The increased flow rate is interpreted to mean that the formation is forcing formation fluids into the well bore. A decrease in the flow rate exiting from the well while pumping at a constant rate is an indicator of lost circulation.

FLOWING WELL WITH PUMPS OFF - When the rig pumps are not moving the mud, a continued flow-out from the well indicates that a kick is in progress. An exception to this indicator is when the mud in the drill pipe is considerably heavier than that in the annulus, as in the case of a slug.

PIT VOLUME CHANGE - If the volume of fluid in the pits is not changed as a result of surface controlled actions, an increase in pit volume indicates that a kick is occurring. The fluids entering the well bore as a result of the kick displace an equal volume of mud at the flow line and result in a pit gain. A decrease in pit volume under these conditions indicates lost circulation.

Two of the kick early warning signs described above require measurement of an increase in flow rate from the fluid return line, while the other requires measurement of an increase in pit volume. These indicators are difficult to interpret when drilling from a floating drilling vessel because of the heaving and rolling of the drilling vessel in response to wind and waves. Floating drilling vessel heaving and rolling creates fluid return line flow rate changes.

It has been found that the time elapsed between the beginning of a kick deep in the well and its detection at the surface by pit level monitoring is too long to provide sufficient time to bring the well under control such as by adding weight to the drilling fluid.

Studies have shown that accurate differential flow measurements, of the order of twenty-five gallons per minute (25 GPM) provides the earliest possible surface detection of kicks and/or lost circulation. Such high absolute accuracy under widely varying conditions for both flow-in and flow-out systems, however, is difficult to obtain with the systems of the prior art.

Presently, flow-in measurement is based on the number of strokes per minute of triplex mud pumps (see FIG. 1). The flow rate obtained from the pump strokes is then corrected by a volumetric pump efficiency. This pump efficiency can fluctuate between 80% to 95% accounting for inaccuracies of plus or minus seven and one half percent in the flow-in measurement.

The prior flow-out measurement has usually included a "paddle" system installed in the rig return line. The paddle is a hybrid flow meter based on level and target (force) measurements. The prior art paddle has an uncalibrated accuracy of around forty percent. With calibration on the rig site, the "absolute" flow-out measurement is still only accurate to ten or fifteen percent due to the basic non-linearity of the device, and due to very poor zero stability of the device. Poor zero stability requires frequent recalibration.

Using the pump strokes and the paddle measurement for flowing and flow-out respectively, the best accuracy for the differential flow over the entire fluid flow range cannot be much better than about twenty-five percent, or three hundred (GPM) in twelve hundred GPM. This is more than ten times the required accuracy, rendering prior methods of differential flow rate measurement inadequate for desired kick detection.

Electromagnetic flow meters have also been used but have drawbacks. They do not work in oil based muds (conductivity too low). They require complete modification of the return line. In offshore rigs where modification of the return line is difficult and space is limited, there is usually no way to install them. They require expensive maintenance to sustain their accuracy.

Other industries have developed flow measuring systems suitable for use in waste water monitoring systems where sewer outflows must be monitored for pollution control purposes. These systems obtain flow measurements based on the velocity of the fluid in a channel and the area of the channel occupied by the flowing liquid. Ultrasonic level detectors and Doppler type velocity detection units have been used for these applications.

U.S. Pat. No. 4,217,777 to Newman issued Aug. 19, 1980 discloses such a system and is incorporated herein for essential material and for all other purposes. Also U.S. Pat. No. 4,202,211 to Perry issued May 13, 1980 discloses a similar system and is incorporated herein for essential material and for all other purposes.

Ultrasonic level detection systems are known in the art. Such systems are described in U.S. Pat. No. 4,024,766 to Perry issued May 24, 1977, U.S. Pat. No. 4,145,914 to Newman issued Mar. 27, 1979, and U.S. Pat. No. 4,228,530 issued Oct. 14, 1980, all of which are incorporated herein for all purposes.

Further, U.S. Pat. No. 4,754,641 to Orban et al., while providing improved results relative to the other methods for measuring fluid flow in return lines, still suffers from inaccuracies due to the requirement of a velocity probe which is inherently inaccurate in measuring mud flow in a drilling rig return line due to the wide range of elements in the mud. Thus, even with this advance, the art does not provide a method for sufficiently accurately determining a volumetric fluid flow rate such that a kick or lost circulation determination can be made in real time on a drilling rig.

SUMMARY OF THE INVENTION

It is therefore an object of the invention to provide an improved method and system for the measurement of volumetric fluid flow rate which is significantly more accurate than prior art methods and provides the measurements in real time while drilling.

It is another object of the invention to provide an improved fluid flow rate measuring system which obtains volumetric flow measurements without directly sensing the velocity of the fluid in the conduit.

It is a further object of the invention to provide an improved system and method for use in a return line of a drilling rig for quickly and accurately detecting a kick or lost circulation in the well bore.

It is even another object of the invention to provide a volumetric flow measuring system for accurately measuring flow rate of a fluid in supercritical flow conditions.

In accord with the objects of the invention, improved methods and systems are disclosed for use in a return line system of a drilling rig to aid in accurately determining a volumetric flow rate of mud in the return line without the aid of a direct velocity measurement means. The system invention broadly comprises: a non-intrusive level sensor located in or in proximity to the return line for sensing the height or level of the mud flowing in the return line and providing a signal indicative thereof; and a processor responsive to the level sensor signals for determining, in conjunction with knowledge of the return line configuration and mud parameters, the flow-out rate of the mud. Where the level sensor is acoustic, the system also includes a multiple of correction sensors for determining the temperature gradient in the return line and for investigating the presence of gas in the return line, and for providing signals indicative thereof to the processor which is responsive thereto. A more complete system also includes calibration means for calibrating the flow-out rate with the flow-in rate, and means responsive to the calibration means for determining an undesirable condition such as a kick or fluid loss. Where the system is to be used on a rig which is subject to movement (e.g. a floating rig), angle and position sensors are also employed.

In accord with other objects of the invention, the level sensor is installed in a chimney which extends from the flow line and which is in close enough proximity to the bell nipple (e.g. less than 10 feet away) such that the mud level is high and the friction between the mud which is in supercritical flow and the flow line is kept small. Where the level sensor utilized is an ultrasonic pulse echo transceiver, the correction sensors include a plurality of temperature sensors at different height locations (e.g. near the mud, at the junction of the return line and a chimney in which the transceiver is mounted, and near the transceiver), to provide information regarding the temperature gradient in the return line, as well as a calibration target which acts to sense a change in sound velocity due to the presence of gas in the return line. Data from the temperature sensors and calibration target help provide a determination of the speed of sound in the air (or air/gas) above the mud such that the echo time measured by the ultrasonic transceiver can be properly correlated to a distance between the transceiver and the mud surface. By knowing the shape and size of the return line, the slope of the return line, the height of the fluid in the return line, and a mud parameter such as the viscosity/density ratio, an accurate flow-out determination can be made without the use of a direct velocity sensor. Where the slope of the return line is changing (as determined by the angle sensor) due to movement of the rig, the flow-out results can be corrected to compensate for the motion. The flow-out determinations are calibrated against the flow-in measurements which are made by detecting mud pump strokes (the positive displacement per pump stroke being known).

Additional objects and advantages of the invention will become apparent to those skilled in the art upon reference to the detailed description taken in conjunction with the provided drawings.

DETAILED DESCRIPTION OF THE PREFERRED EMBODIMENTS

Figure 1:
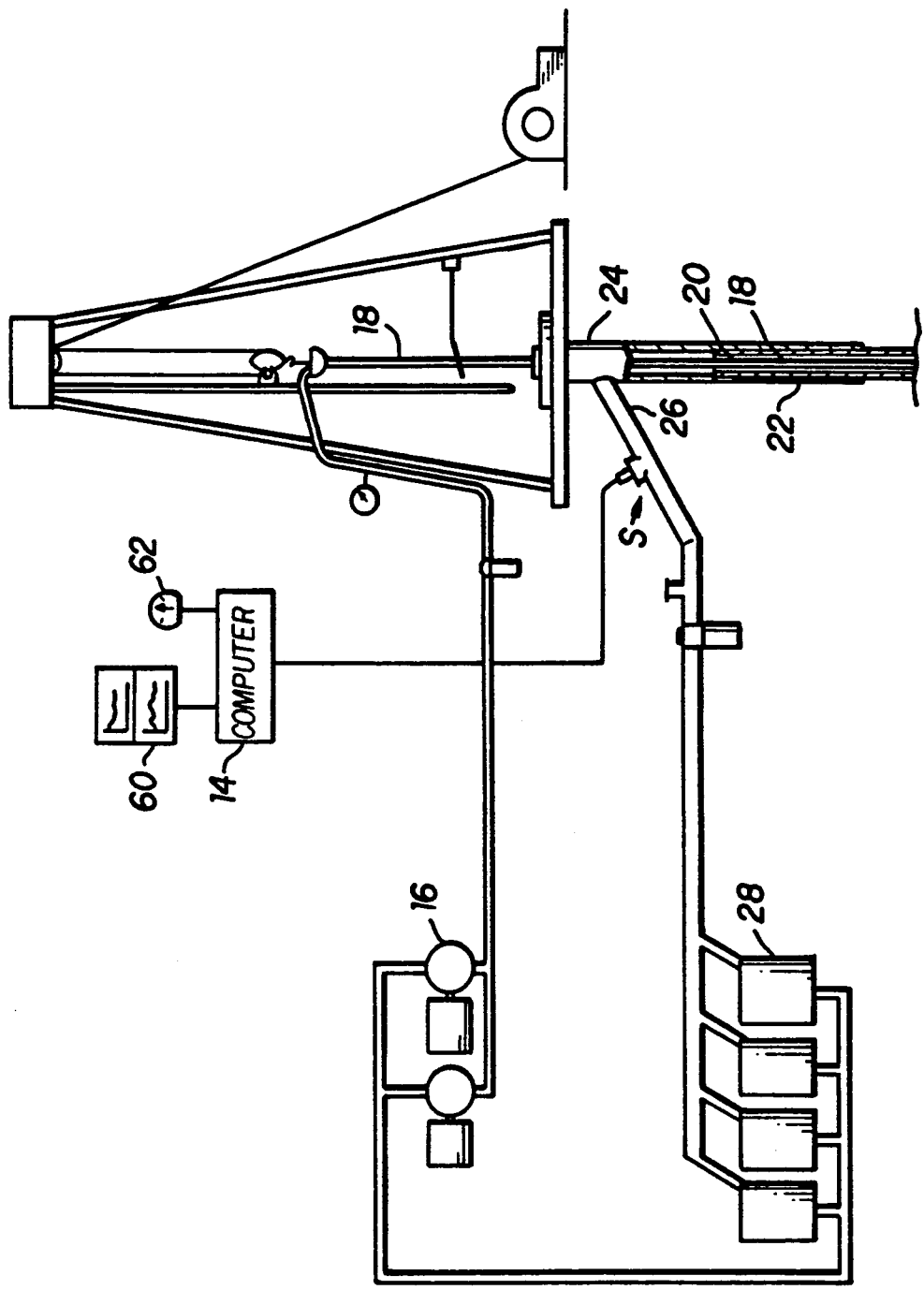
FIG. 1 is a schematic view of a drilling fluid or "mud" circulation system for a floating or fixed drilling rig where a flow measuring system embodying the invention may be used.
Figure 2A:
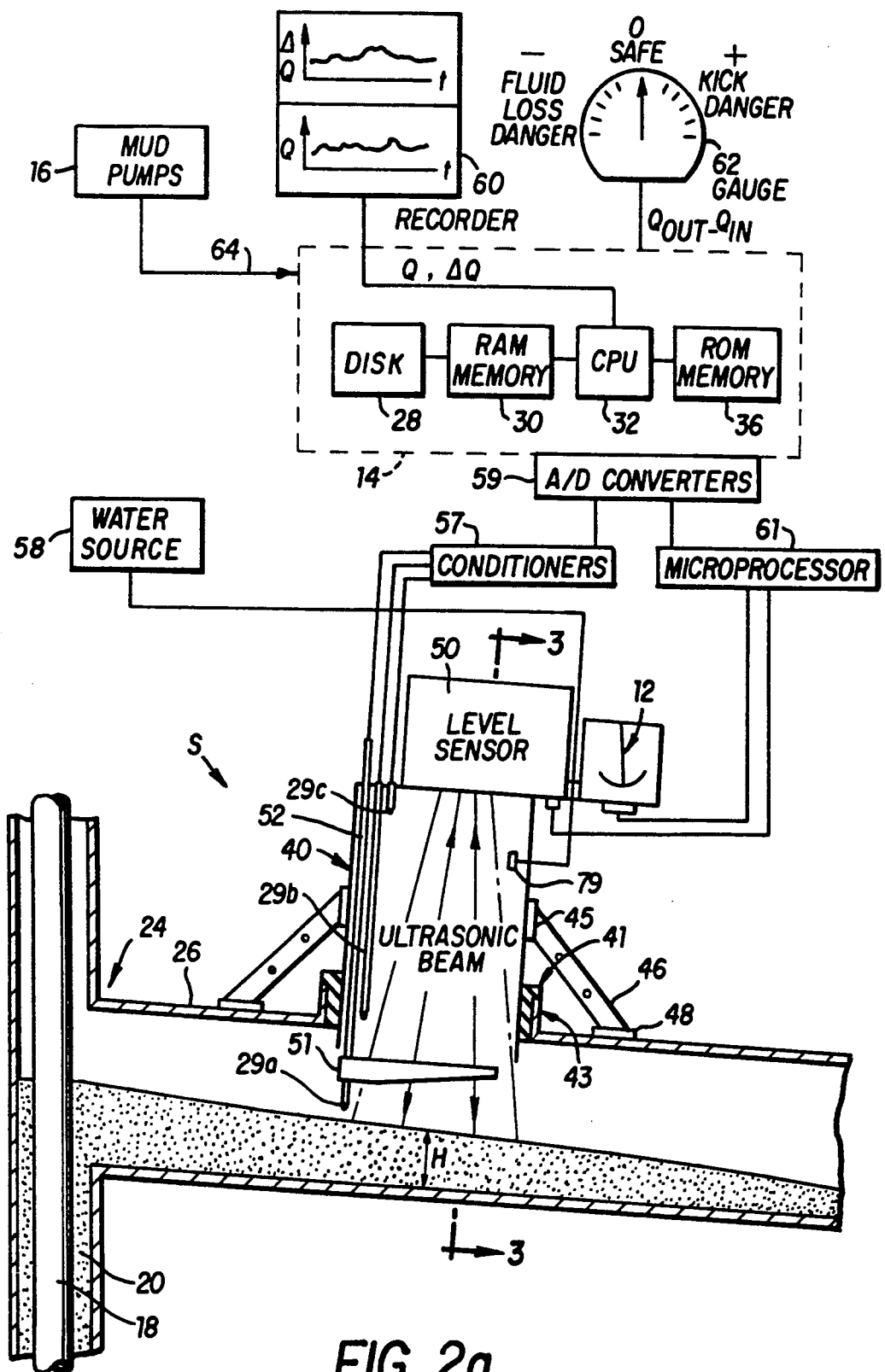
FIG. 2a is a cross-sectional view of a return line system of the invention illustrating the fitting of an ultrasonic sensor system into an opening in the return line and schematically illustrating connection of the sensor system to a computer and associated instrumentation.
Figure 2B:
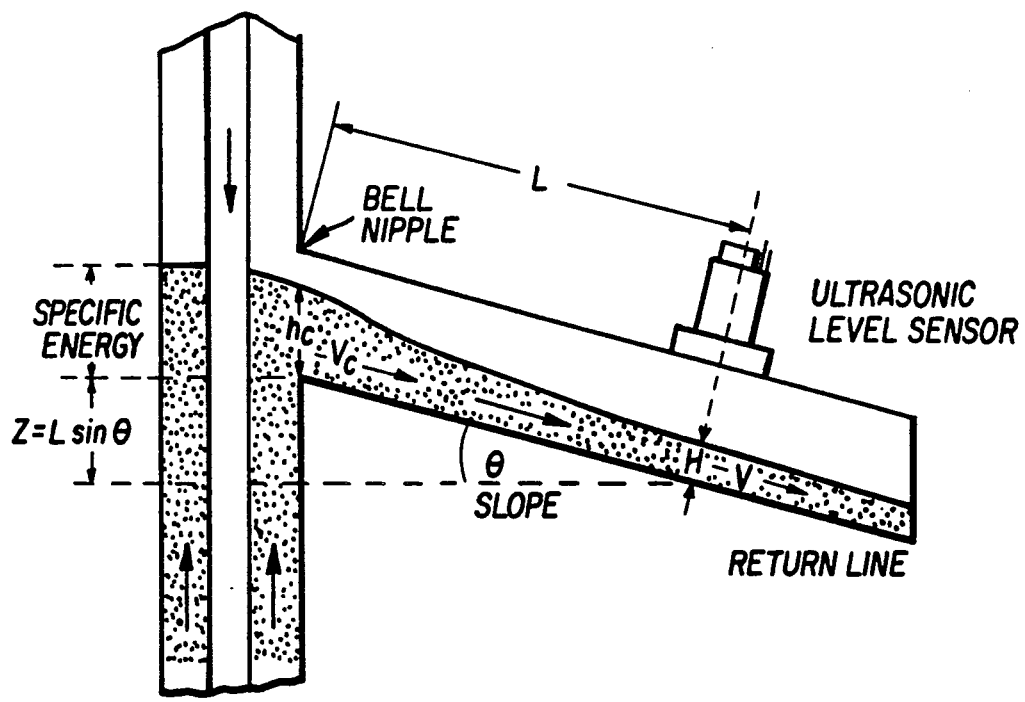
FIG. 2b is a schematic of the return line system indicating distances, heights, and mud velocities.
Figure 3:
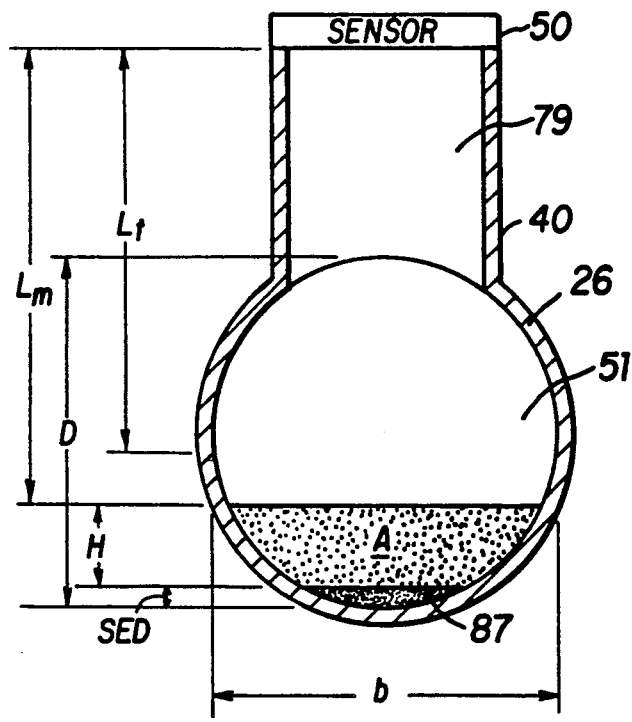
FIG. 3 is a section view along line 3—3 of FIG. 2a illustrating the return line which is fitted with a chimney.

The volumetric flow sensor system, generally designated S, and associated computer 14, embodying the invention are illustrated in FIGS. 1-3. The flow measuring system includes an ultrasonic level sensor S, and a processing means or digital computer 14, as best illustrated in FIG. 2a.

Referring to FIG. 1, a floating or fixed drilling rig mud circulation system is schematically illustrated, and it will be appreciated that the invention may be used with a bottom supported offshore drilling rig or a land drilling rig, as well as with a floating rig. As discussed above, flow rate into the well may be derived by counting the strokes per minute of mud pumps 16 or by direct measurement with a flow meter. After the "mud" or drilling fluid travels down the drill string 18, it moves up the annulus 20 between the casing 22 and the drill string 18 to the bell nipple 24. A return line 26 communicates with the bell nipple 24, as best shown in FIGS. 1 and 2a, to return the mud to the mud pits 28. The flow-out measuring sensor system S according to the invention is disposed in the return line 26 in relative close proximity to the bell nipple 24; preferably within ten feet thereof.

The sensor system S in cooperation with a computer 14, which by way of example only includes a disk memory 28, a RAM memory 30, a CPU 32, and a ROM memory 34 (see FIG. 2a), is provided to accurately measure in real time the flow Q through return line 26. The volumetric flow Q is simply the product of the cross-sectional area A of fluid flowing at a given location in the line and the average velocity of the fluid moving at that location. However, because a determination of velocity is not made with a velocity probe, as most velocity probes are either intrusive or cannot handle the wide range of mud rheology, cutting, gas, etc., the determination is made in the following manner.

In a simple return line geometry such as that seen in FIG. 2a, the velocity of mud in the annulus 20 is typically between one-half and one ft/sec, whereas the velocity of the mud in the return line 26 is typically between five and ten ft/sec. The acceleration of the mud is due to gravity and the slope of the return line, with the slope being great enough (e.g. typically greater than 0.5 degrees) to overcome the retarding effects of friction between the fluid and the pipe wall. In fact, most return lines have a slope of between two and twenty degrees. Under these conditions, a "critical flow" is established in the bell nipple, with the mud having a depth $H_c$ and velocity $V_c$ as seen in FIG. 2b. As the flow accelerates down the return line, the mud is in supercritical flow, and the velocity increases and the mud depth decreases, as is seen in FIG. 2b. This condition continues until the friction loss increases enough to offset the gravitational forces causing the acceleration. However, most return lines are too short for this equilibrium to be reached.

Figure 4:
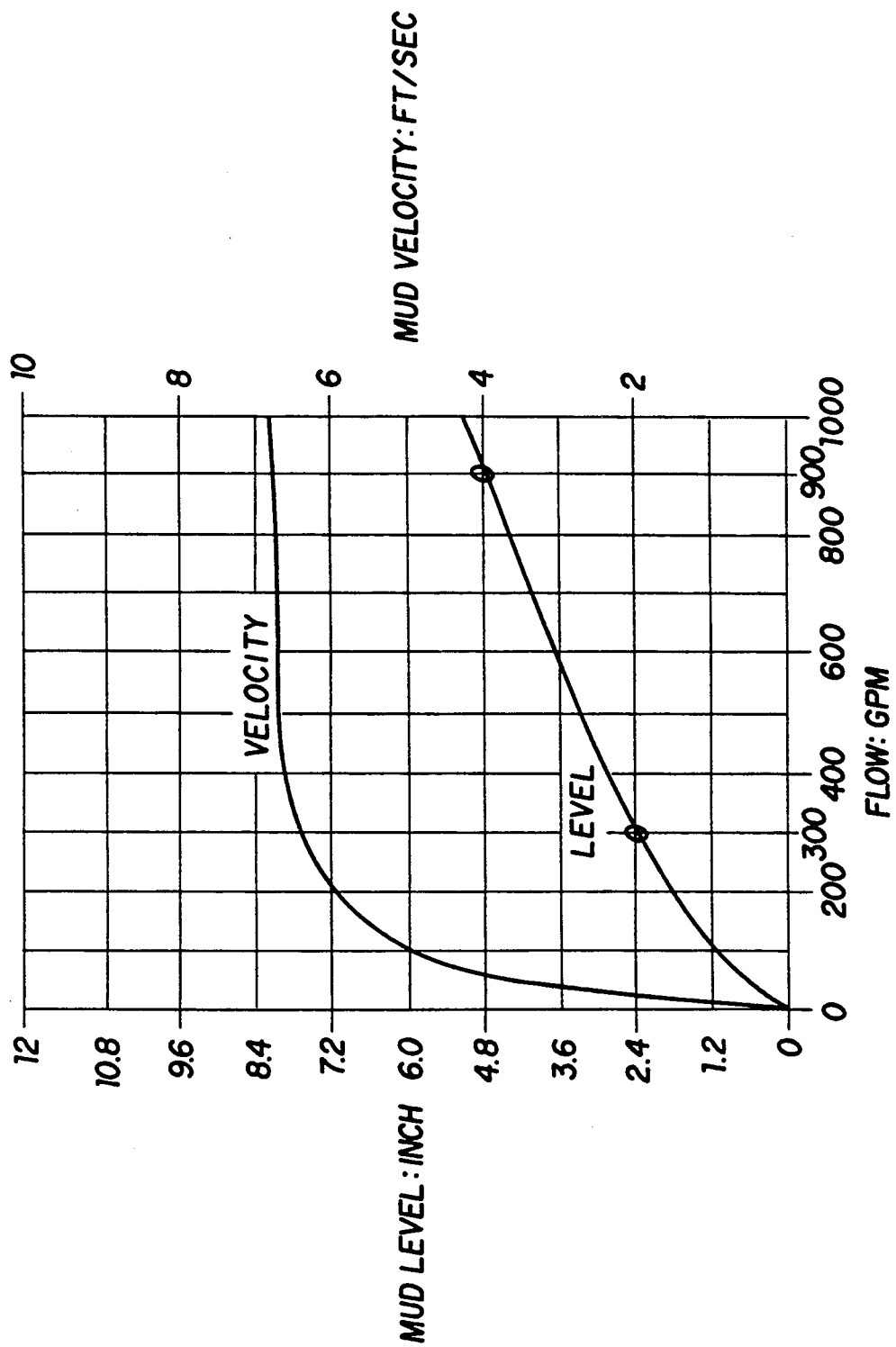
FIG. 4 is a graph illustrating the relationship between the mud level and the mud velocity for a particular return line geometry.

The inventors have found that in a typical return line with mud in supercritical flow, an increase of flow typically translates into an increase in mud depth (level) according to a substantially linear relationship for flow rates above about two hundred gallons per minute (200 GPM). Put another way, and as seen in FIG. 4 which shows the relationship between flow rate, mud level, and velocity in a return line, mud velocity is almost constant above 200 GPM, and an increase in flow rate directly translates into an increase in mud depth. Thus, for any given return line configuration with typical flow rates, the measured height of the mud in the return line may be calibrated to a flow rate with reasonable accuracy. By way of example, the measurements indicated in FIG. 4, which relate level to flow, were made three feet from the bell nipple in a return line of twelve inch diameter and five degree slope, and a mud with a density of twelve PPG and viscosity of ten cp. For return lines of different diameter or slope, mud of a different viscosity/density ratio, and a measurement location of different distance from the bell nipple, the curves of FIG. 4 would assume different values.

As stated above, a review of FIG. 4 indicates that the GPM flow-out can be determined directly from the mud level without a determination of velocity. Thus, for the stated return line geometry and mud properties, a measured mud depth (or level) of 2.4 inches is equivalent to a mud flow-out of 300 GPM, while a measured mud depth of 4.8 inches is equivalent to a mud flow-out of 900 GPM. With a slope of 2.4"/600 GPM, in order to achieve a desired accuracy of the order of 25 GPM, a measurement of mud depth must be accurate to at least 0.1 inch.

Given the fact that flow rate can be measured directly from mud level if the return line geometry and mud makeup are known, means and methods for making the level measurement must be set forth. One preferred means for accomplishing the mud level measurement is seen in FIG. 2a where a sensor system mounts on the return line 26 and sits in an eight inch diameter hole cut into the return line. Sensor system S includes a chimney section 40 of six inch diameter in which the mud level sensor is mounted, and an inflatable seal 41 which fits around the chimney and inside pipe flanges 43 welded to the cut in the return line 26. For mechanical stability and alignment purposes, a support 45 is provided around chimney 40. Turnbuckles 46 connect the support to clamp 48 which grips the return line 26. This permits alignment of the sensor system S relative to the return line such that the sonic beam produced by a transceiver 50 (as discussed below) is substantially normal to the mud. In this arrangement, sonic beam reflections can be received and sensed by the transceiver 50.

Sensor system S may be provided in any top entry opening in return line 26, although it is preferable that the system be employed within ten feet of the bell nipple. Sensor system S achieves access to the interior of return line 26 without the need for line 26 being disconnected from an existing rig hookup to bell nipple 24.

The sensor system S includes a mud depth or level sensor for measuring the distance between the sensor and the mud surface. The sensor preferably includes an ultrasonic transmitter-receiver ("transceiver") 50 which both transmits and detects ultrasonic waves. Because a transceiver cannot detect a wave immediately after it has transmitted one (i.e. the transceiver has "dead time"), the transceiver 50 is preferably mounted in a housing or chimney 40 which removes the transceiver from the mud surface and causes the return signal to be received after the dead time. Mounting the transceiver 50 in the chimney 40 also protects it from mud splashing. Even so, a water sprayer 79 which receives water from water source 58 is preferably provided to clean the transceiver 50 and the other sensors located in or about chimney 40.

To convert the echo return time into a distance requires knowledge of the velocity of sound in the medium through which the sound pulse travels, as distance is equal to the product of time and velocity. Parameters affecting the velocity of sound include the temperature and the composition of the medium through which the sound travels. As the composition and the temperature of the "air" above the mud in the return line can change over time, additional sensors are utilized to monitor these parameters. For temperature, preferably three sensors 29a, 29b, and 29c are utilized to measure the heat gradient present between the mud surface and the transceiver 50. Thus, the first sensor 29a is placed on adjustable pole 52 and located near the mud. A second sensor 29b is located at the junction of the return line 26 and the chimney 40, while the third sensor 29c is located close to the transceiver 50. The sensors used are preferably AD590 solid state devices available from Analog Devices which produce exactly 1 microamp per degree Kelvin and are accurate enough to be calibrated electrically.

A manner for compensating the determined echo time for temperature gradients and changes therein is found in U.S. Pat. No. #4,754,641 and will not be further discussed herein. It should suffice to note that all temperature determinations are fed via signal conditioners 57 and A/D converter 59 to the computer or processor means 14 which utilizes the temperature and echo time information in providing a distance, and hence a return line mud height determination. It should also be noted that similar techniques can be used with fewer or greater numbers of temperature sensors to provide more or less accuracy, and it is not the intent hereof to be limited to exactly three temperature sensors.

In taking into account the composition of the medium through which the sound is travelling, it is not necessary to determine the actual composition. Rather, it is only necessary to have a reference from which relative changes can be calculated. In particular, the provision of a reference target 51 on adjustable pole 52 at a known distance from the transceiver 50 permits a determination of the time it takes for the ultrasonic waves to travel a fixed distance at the temperatures provided by the temperature sensors 29a and 29b in whatever medium is present (e.g. air, gas, or air/gas mixture). Thus, by first sensing the reference echo time from transceiver 50 to target 51 and back to transceiver 50, and then sensing the echo time from transceiver 50 to the mud surface and back to the transceiver 50, the reference echo time can be used in conjunction with the temperature information to determine the distance between the transceiver 50 and the mud surface in an extremely accurate manner.

In using the reference signal for correcting for the medium composition, the following equations may be used:

$$V_s = (KT_a)^{0.5} \quad (1)$$

$$2 L_m = \Delta T_m (KT_m)^{0.5} \quad (2)$$

$$2 L_t = \Delta T_t (KT_t)^{0.5} \quad (3)$$

where $V_s$ is the sonic velocity, $T_a$, $T_m$, and $T_t$ are respectively the absolute temperature, the mean temperature of the mud path and the mean temperature of the target path, K is the effect of the gas composition on the sonic velocity, $L_m$ is the distance from the transceiver 50 to the mud surface in the return line, $L_t$ is the distance from the transceiver to the target, and $\Delta T_m$ and $\Delta T_t$ are the mud echo and target echo times respectively.

Dividing relationship (2) by (3) and rearranging yields:

$$L_m = L_t (\Delta T_m / \Delta T_t)(T_m / T_t)^{0.5} \quad (4)$$

which indicates that with the reference target, the distance to the mud surface is derived from measurable ($\Delta T_m$, $\Delta T_t$, $T_m$, $T_t$) or known ($L_t$) parameters and is not dependent on the composition effect K of the gas. It should be noted that $T_m$ and $T_t$ as provided represent the mean of the gradient over distances $L_m$ and $L_t$ respectively, and that more complex representations more specifically accounting for temperature gradients would suggest themselves to those skilled in the arts.

Although knowing the actual composition of the medium through which the sound pulses travel is not necessary in practicing the present invention, it has been found that the method and apparatus of the present invention can be used effectively to detect the presence of methane gas ($CH_4$) in the mud return line and to calculate an approximate volumetric fraction of methane. Specifically, since the speed of sound in "air" (nitrogen/oxygen mixture) is approximately 332 m/sec at 0° C. while the speed of sound in methane is approximately 430 m/sec., a large change in the speed of sound measurement derived from the target signal may properly be interpreted to indicate the far the most abundant gas encountered during a drilling operation.

In equation (1) above, K is equal to the ratio of specific heats (Cp/Cv) or $\gamma$, times the universal gas constant R, divided by the molecular weight MW. For air, $\gamma$ is approximately 1.4 and MW is approximately 29 while for methane, $\gamma$ is approximately 1.3 and MW is 16. For a mixture of gases containing X volume fraction of methane and (1−X) volume fraction of air, $$(MW/\gamma)_{mix} = X(16/1.3) + (1-X)(29/1.4)$$

which when combined with equation (1) above yields:

$$V_S(\text{air})/V_S(\text{mix}) = (1 - 0.4X)^{0.5}$$

which relates X, the volume fraction of $CH_4$, to the change in the measured speed of sound ($V_S$) corrected by temperature as described above.

In operation, a measurement of the speed of sound known or assumed to be pure "air" is taken and stored in one of the memories of computer 14 as a reference. Then, as further measurements are taken in operation mode, the measured speed of sound is compared to the reference and X is solved for in equation (4b) above either on command or automatically, and displayed on recorder 60.

In order to obtain both target and mud echo information, the target 51 should be located in the return line such that the echoes received from the target do not interfere with the echoes received from the mud surface. In return lines of different diameters, the location might need to be different to avoid the second echo of the target. The placement of the target 51 on the adjustable pole 52 permits such adjustment and ensures that the target can be located at a location of more than half the distance from the transceiver to the mud surface. Alternatively, if desired, the sensing of the target and mud echoes can be time multiplexed. Also, if desired, automatic adjustment of transceiver transmission frequency in order to obtain the largest echo signals available can be provided by having microprocessor 61 which controls sensor 50 conduct a search for the best frequency.

Once the distance between the transceiver 50 and the mud surface (and the distance between the transceiver and the pipe or sediment surface of an "empty" pipe which may be determined by using the sensor system or through a knowledge of the pipe diameter etc.) is determined by the computer 14, a direct determination of flow rate may be obtained from a look-up table representing the mud height to flow rate relationship for the particular return line and mud parameters. Such a look-up table is generated either by accumulating experimental data or according to the following theoretical analysis.

Flow rate (Q) may be defined as the mathematical product of fluid velocity (V) and the cross-sectional flow area of the mud (A); i.e. Q=VA. The cross-sectional flow area of the mud is simply a function of the mud level and the geometry of return line. Complicating factors such as the presence of sediment 87 (as seen in FIG. 3) may also be taken into account, such as discussed in U.S. Pat. No. #4,754,641. The sediment level may be determined in the absence of flowing mud. It is assumed that the sediment is simply stationary material which is taking up some of the cross-sectional area of the return line. While the resulting geometry of the fluid flow is not a simple one, it is nevertheless within the knowledge of those skilled in the art to solve for the cross-sectional flow area.

A determination of average fluid velocity (V) is not as straight-forward as the determination of cross-sectional area, particularly because the determination is not a direct one (i.e. no velocity sensors are used). With a simple return line geometry and no friction, the velocity of the mud would be a direct result of the vertical fall of the liquid surface; the energy of which would be converted from potential to kinetic energy. In particular, such a system could be described according to the following relationships:

$$E = h + V^2/2g \tag{5}$$

$$Q = AV \tag{6}$$

where relationship (5) is the basic energy equation which equates the total energy E to the potential energy related to height h, and the kinetic energy related to velocity V and gravity g, and relationship (6) is the basic continuity equation which equates volumetric flow rate Q with area A and velocity V. From (5) and (6) follows:

$$E = h + Q^2/2gA^2 \tag{7}$$

Taking the derivative of relationship (7) with respect to h yields:

$$dE/dh = 1 + (Q^2/2g)(d/dA)(1/A^2)dA/dh \tag{8}$$

where dA/dh is the surface width of the fluid=b. In critical flow, where the energy E is at a minimum for a given flow rate Q, dE/dh=0, and the area A is the critical area $A_c$. Thus, relationship (8) simplifies to $$A_c^3/b = Q^2/g \tag{9}$$

Substituting the continuity equation (6) for critical flow into relationship (9) and solving for critical velocity yields $$V_c = (gA_c/b)^{0.5} \tag{10}$$

where $V_c$ is the critical velocity, g is the acceleration due to gravity, $A_c$ is the critical cross-sectional area of the mud in the return line close to the junction of the return line with the bell nipple (i.e. the critical area), and b is the surface width of the fluid. For a given mud flow rate Q and geometry which relates $A_c$ and b, the critical velocity $V_c$, the critical area $A_c$, and the critical depth $h_c$ become known. As a result, tables can be generated which relate various flow rates Q and resulting values of $V_c$, $A_c$ and $h_c$.

While relationships (5)–(10) assume the absence of friction up to the critical point, it will be appreciated that friction does play a role in the velocity of the mud in the return line, and accounting for friction is necessary. The following conservation of energy equation makes such an account:

$$Z + h_c + V_c^2/2g = H + V^2/2g + f(L/D)(V^2/2g) \tag{11}$$

where f is a friction factor, H is the height of the fluid surface at the location of the level sensor, L is the distance from the bell nipple to the level sensor, Z is equal to the product of L and the sine of the slope angle $\sigma$ of the return line,(i.e. Z=L sin $\sigma$) and D is the hydraulic diameter which is equal to 4A/wetted perimeter. The slope angle $\sigma$ of the return line is either predetermined, or is measured with an angle sensor 12. Angle sensor 12 is preferably a pendulux sensor, with the pendulum acting to change the resistance of a potentiometer. The pendulum sensor 12 is particularly important with respect to rigs which are subject to movement as will be discussed hereinafter.

With the provided continuity (6) and critical flow (10) equations and with the provided energy equation (11), the velocity V at the location of the level sensor can be determined as long as the friction factor f can be found. The friction factor f can be determined according to the Reynold's number $R_e$ pursuant to well known equations. The Reynold's number, in turn, is dependent on the velocity, hydraulic diameter, density and viscosity of the flowing fluid according to Re=VD $\rho/\mu$. The density and viscosity are typically monitored on the job site and are available. Account, however, should be taken if the viscosity or density changes significantly over time. By keeping the location of the level sensor near the bell nipple, a crude estimate of friction is sufficient, as the inventors have determined that within approximately ten feet of the bell nipple, the friction losses of the returning fluid are small and that a crude estimate yields reasonable results. In fact, Re and f are considered to be constant and equal to their critical values throughout the length of the return line (although the critical values may change over time if the flow or mud parameters change). This is a reasonable approximation for as the velocity increases, the depth decreases, tending to keep Re constant. A typical friction loss of about twenty percent yields a velocity reduction of about ten percent, and an error of ten percent in analyzing the friction losses would result in a tolerable change of velocity of only one percent. Regardless of how the friction loss determination is originally estimated, calibration of flowout corrects for any inaccuracies as is hereinafter described. In sum, then, equations (5)–(11) are solved at the outset of a job for the fixed values of the pipe size D, distance between the sensor system S and the bell nipple L, return line slope $\sigma$, mud viscosity $\mu$, and mud density $\rho$, to establish the height (h) to flow (Q) look-up table appropriate for the job.

Figure 5:
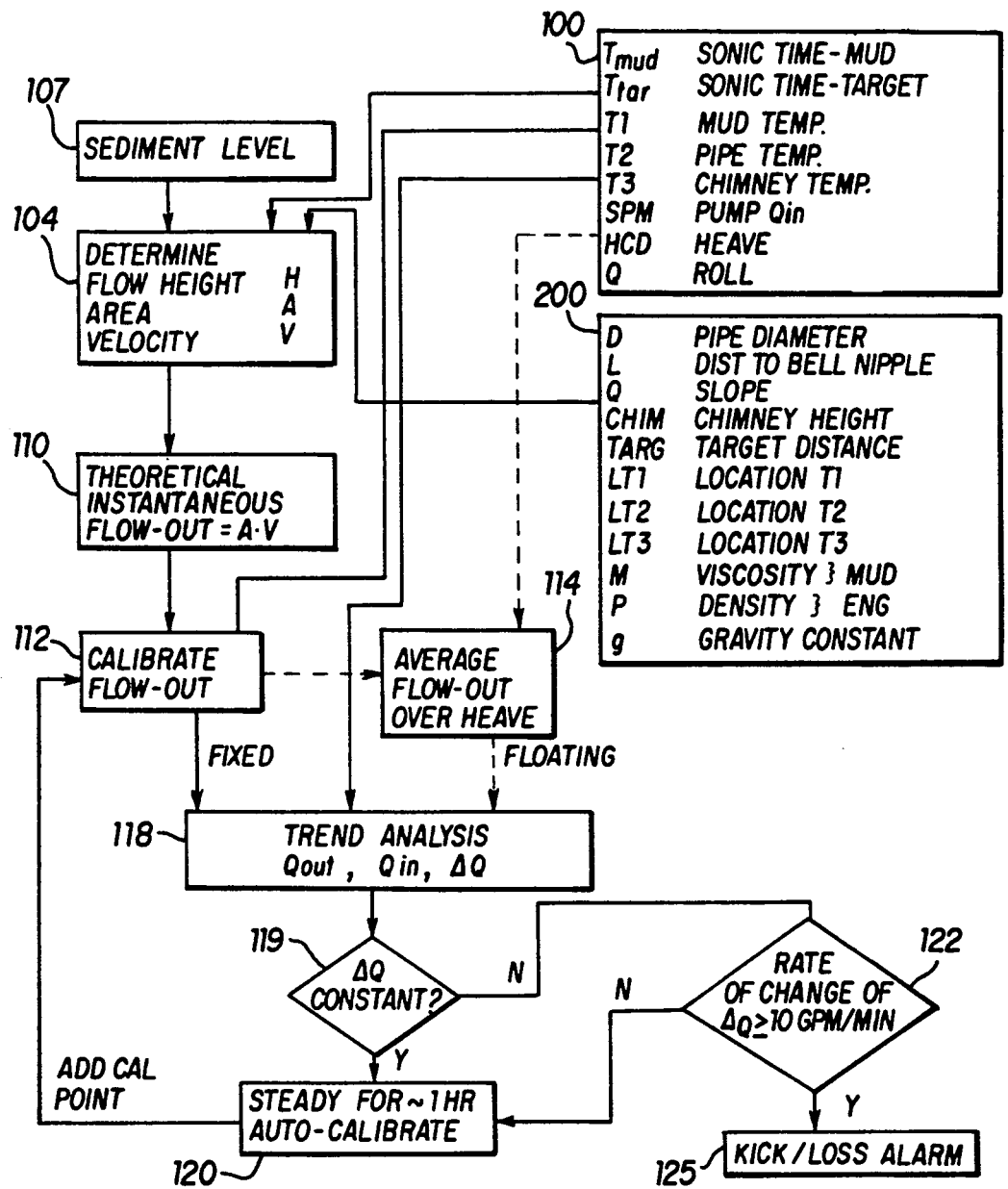
FIG. 5 is a logic flow diagram representative of one embodiment of the method invention.

Turning to FIG. 5, the method for determining the flow rate in the return line, which utilizes calibration is seen. At 100 the echo times for the reference target and for the mud surface are measured, along with the temperature gradient in the return line and chimney as measured by the temperature sensors. Also, as will be discussed hereinafter, the flow into the well is measured. In a preferred embodiment, the angle of the return line, and the density and viscosity of the mud are further measured. At 104, the echo times and temperature gradient are used to find the fluid flow height H. Also, at 104 the mud viscosity and density are used in conjunction with parameters stored at 200 such as the return line geometry (e.g. diameter), the horizontal distance from the bell nipple to the measurement location (L), the return line slope ($\sigma$), the gravitational constant (g), and any other relevant parameters which are constant for the given system, to provide a determination of the velocity of the mud in the return line at the measurement location in accord with equations (4) through (11) above. From the fluid flow height, the cross-sectional area of the mud in the return line at the measurement location is determined at 104. If available, additional information such as sediment level (box 107) may be provided to the processor which determines at 104 the cross-sectional area of the mud.

At 110, a determination of the flow-out (Q) of the mud from the wellbore is obtained from a transform (i.e. look-up table such as is represented by FIG. 4 for the provided return line and mud parameters) which relates the flow height to flow-out. Alternatively, the flow-out (Q) is found as the product of the determined cross-sectional area (A) of the mud and the mud velocity (V) at the measurement location. The flow-out (Q) determination at 110, however, is preferably viewed as a theoretical flow-out, such that through a calibration, an absolute flow-out determination (which is only absolute relative to accuracy of the flow-in pump measurements) can be made. Thus, at start-up a single or multi-point calibration lasting only several minutes is preferably performed, and provides a calibration between the actual flow-out and the "estimated" theoretical flow out. The calibration accounts for non-linearity, errors in estimating friction, and other systematic errors which may be present such as changes in geometry, mud properties, sensor calibration, etc. Then, during drilling, when the theoretical flow-out determination is made at 110, the flow-out determination is corrected at 112 by the calibration constant calculated at start up.

Figure 6A:
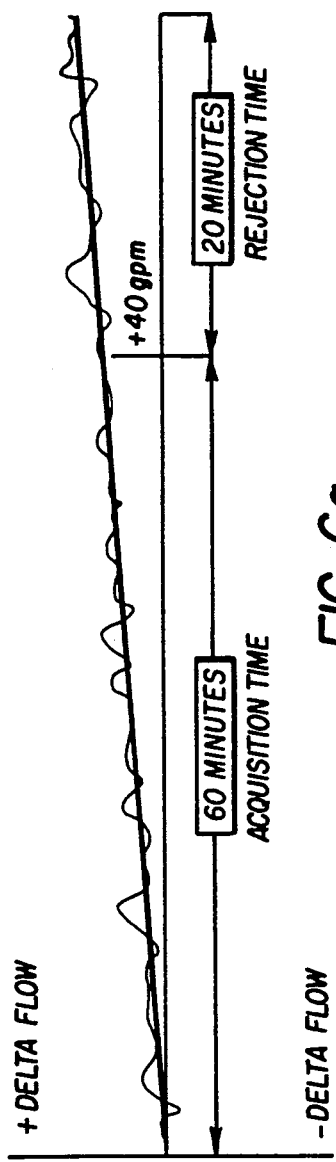
FIG. 6a is an illustrative plot of a delta flow over time situation which is not indicative of a kick or loss.
Figure 6B:
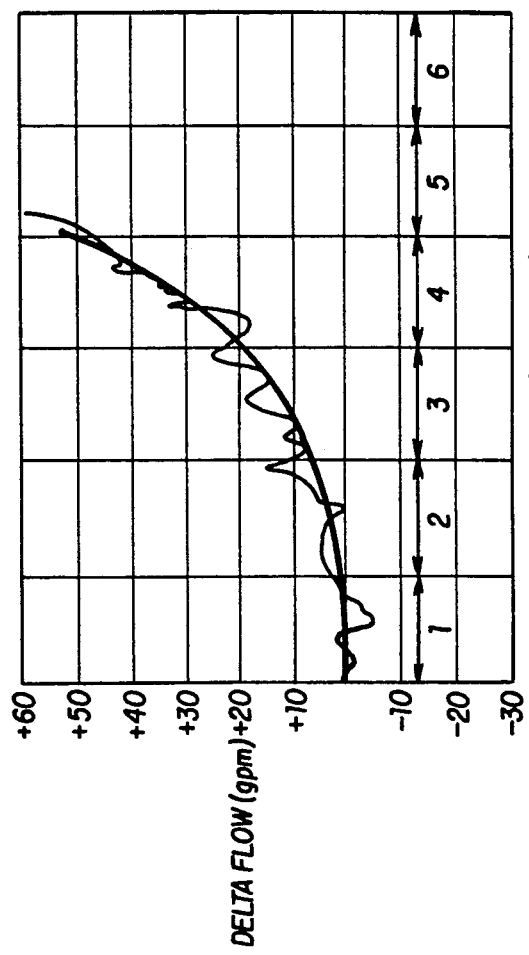
FIG. 6b is an illustrative plot of a delta flow over time situation which is indicative of a kick.

The corrected flow-out determination is subjected to a trend analysis where the flow-out determination of 112 is compared at 118 continuously to the flow-in measurement measured by the positive displacement mud pump strokes at step 100 to determine whether there is any difference between the two. Where there is a difference, that difference is monitored at 119 over time to determine whether the difference is relatively constant over time. If the difference is relatively constant (i.e. steady or slowly changing) it is assumed that the flow-in or flow-out calibration has drifted and an average calibration coefficient (over a period of about an hour) is determined at 120 and fed back to the calibration correction step 112; i.e. autocalibration. If the difference between flow-out and flow-in ($\Delta Q$) is not relatively constant, a determination is made at 122 as to whether the rate of change is greater than or equal to 10 GPM/Min over a four minute time span. If the rate of change is less than 10GPM/Min (as seen in FIG. 6a) noise or measurement drift is assumed, and the situation is accommodated via autocalibration. If the rate of change is greater than 10 GPM/Min a warning is given, and if it lasts for four minutes, as seen in FIG. 6b, an alarm is sounded by gauge 62 (of FIG. 2) and an influx (kick) or an outflux (fluid loss) situation is declared at 125. Regardless, the flow-out, and delta flow determinations are preferably recorded at recorder 60 (of FIG. 2) in a log format over time.

If the rig is a "floater" as opposed to being bottom supported, the instantaneous flow rates vary with the heave of the vessel. For that reason, an average flow rate must be determined over a heave cycle for an accurate determination of flow-out. Accordingly, a heave position detector (not shown) which is standard equipment on floaters is used to find the heave cycle to which the rig is subjected, and the instantaneous flowout rate determined at 110 (utilizing the appropriate look-up chart for the angle $\sigma$ of the return line sensed by angle sensor 112) is averaged at 114 over that cycle. The average flow-out is then subjected to the trend analysis 118 where it is compared to the flow-in. The delta flow is then monitored at 119 to determine whether the delta flow is changing. If not, autocalibration is conducted at 120 in order to provide a calibration constant which can be used to correct the average flow-out determination of 114. Additional detail regarding averaging for floating rigs may be had with reference to U.S. Pat. No. 4,754,641.

Figure 7A:
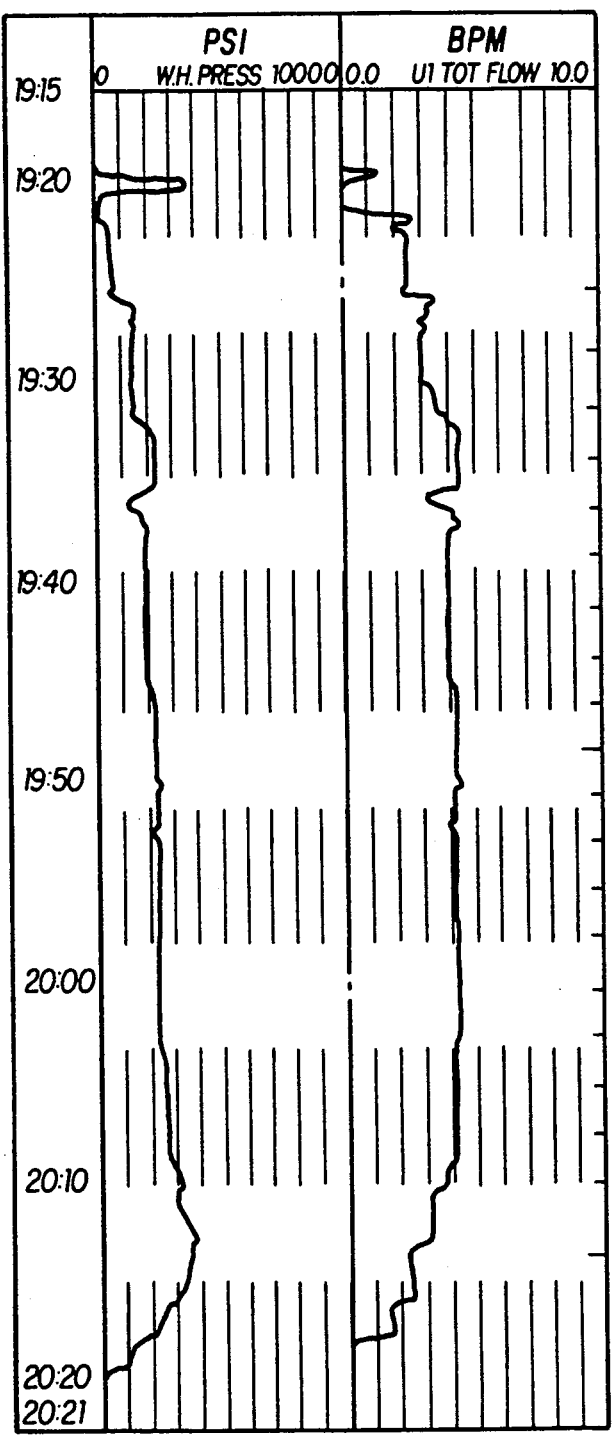
FIGS. 7a and 7b are logs of the flow-in of mud-displacing cement into a well-bore as measured from a cement truck, and the volumetric flow-out therefrom as measured by the system of the invention, respectively
Figure 7B:
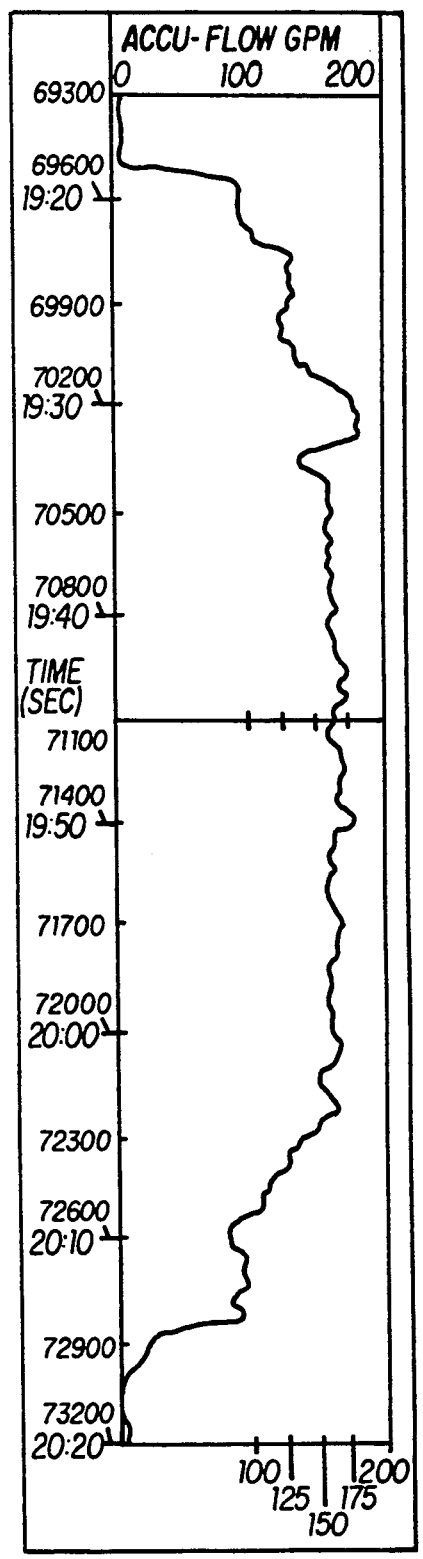

Testing the system and method inventions during a cementing operation where the flow-in was carefully measured independently by the cement truck pumps (not by the rig mud pumps), it was determined that the system and method inventions provide an excellent determination of flow-out. As seen in FIGS. 7a and 7b, during a period of slightly over an hour, the measured flow-out (FIG. 7b) tracked the known flow-in (FIG. 7a) accurately. In fact, the total volume of cement and mud that was used during the hour as measured by the cement truck was two hundred seven barrels, while the measured (via integration) displaced out-flow was two hundred one barrels; a very acceptable difference of only three percent.

There have been described and illustrated herein systems and methods for measuring the volumetric flow of a fluid in a return line. While particular embodiments have been illustrated and described, it is not an intention that the invention be limited thereto, as it is intended that the invention be as broad in scope as the art will allow. For example, while a system was described as having three temperature sensors, and a reference target for "sensing" a change in medium above the mud, it will be appreciated by those skilled in the art that the sensors and reference target are employed for compensating the transceiver echo time for a changed speed of sound, and that other correction means could be utilized. Also, while the system was described as using an ultrasonic transceiver, equivalents of the same, including separate transmitters and receivers, could easily be utilized. In fact, if desired, the ultrasonic transceiver as well as the temperature sensors and reference target may all be replaced by an optic or radar system which could accurately sense the height of the mud in the return line. Further, while the sensor system is preferably located within ten feet of the bell nipple in order to minimize the effect of friction, it will be appreciated that it is still possible to locate the sensor system beyond that distance if account is taken of friction in accord with the technical discussion provided herein with reference to Reynold's numbers etc., or if account is taken of friction through calibration. Therefore, it will be apparent to those skilled in the art that yet other changes and modifications may be made to the invention as described without departing from the scope and spirit of the invention as so claimed.

We claim:

1. A system for obtaining an indication of volumetric flow of a drilling mud exiting a well bore through an annulus between a drill pipe and the well bore and up to a bell nipple and out to a drilling rig return line connected to said bell nipple at an angle such that said drilling mud partially fills said return line and is in supercritical flow in said return line, said return line having a known physical configuration, said system comprising:
   a) a non-intrusive mud level sensor means located in or in proximity to said return line for sensing the height of the mud flowing in the return line without affecting mud flow and for providing signals indicative thereof; and
   b) means responsive to said level sensor signals, and in conjunction with return line configuration, for providing an indication of the flow-out volume of the mud from said well bore.

2. A system according to claim 1, further comprising:
   c) means for detecting an indication of flow-in volume to said well bore; and
   d) calibration means for calibrating the flow-out volume indication with the flow-in volume indication to provide a correction indication, and for using said correction indication and said flow-out volume to provide a corrected flow-out volume determination.

3. A system according to claim 1, further comprising:
   c) means for obtaining an indication of flow-in volume to said well bore; and
   d) means responsive to said indications of flow-in and flow-out volumes for determining an undesirable condition in said well bore.

4. A system according to claim 2, further comprising:
   e) means responsive to said calibration means for determining an undesirable condition in said well bore.

5. A system according to claim 1, further comprising
   c) angle sensing means for sensing the angle of said return line and providing indications thereof to said means (b) which is further responsive thereto, wherein
   said return line configuration data comprises return line angle as determined by said angle sensing means, and return line shape.

6. A system according to claim 4, wherein:
   said return line configuration data comprises return line angle and return line shape.

7. A system according to claim 1, further comprising:
   c) a chimney fixed to said return line, said acoustic level sensor means being supported by said chimney.

8. A system according to claim 7, wherein:
   said level sensor means is an acoustic level sensor, said system further comprising
   d) correction sensor means for determining at least one ambient condition in said return line, and for providing signals indicative thereof to said means responsive to level sensor signals.

9. A system according to claim 8, wherein:
   said acoustic level sensor means is an ultrasonic pulse echo transceiver; and
   said correction sensor means includes a plurality of temperature sensors located at different heights relative to said the surface of said mud flowing in said return line.

10. A system according to claim 9, wherein:
    said plurality of temperature sensors comprises a first temperature sensor located in relative close proximity to and above said mud surface, a second temperature sensor located substantially at the junction of said return line and said chimney, and a third temperature sensor located in said chimney in relative close proximity to said transceiver.

11. A system according to claim 10, wherein:
    said correction sensor further includes a target supported by said chimney or said return line and mounted above said mud surface and at a determinable distance from said transceiver for reflecting a portion of the acoustic energy transmitted by said transceiver back to said transceiver.

12. A system according to claim 11, wherein:
    said target is mounted on a pole which is adjustably supported by said chimney.

13. A system according to claim 4, further comprising:
    f) a chimney fixed to said return line,
    wherein said level sensor means is an ultrasonic pulse echo transceiver supported by said chimney,
    said correction sensor means includes a plurality of temperature sensors located at different heights relative to said the surface of said mud flowing in said return line, and a target supported by said chimney or said return line and mounted above said mud surface and at a determinable distance from said transceiver for reflecting a portion of the acoustic energy transmitted by said transceiver back to said transceiver.

14. A system according to claim 3, wherein:
    said level sensor means is located within ten feet of said bell nipple.

15. A system according to claim 4, wherein:
    said level sensor means is located within ten feet of said bell nipple.

16. A system according to claim 7, wherein:
    said level sensor means is located within ten feet of said bell nipple.

17. A system according to claim 11, wherein:
    said level sensor means is located within ten feet of said bell nipple.

18. A system according to claim 5, wherein:
    said means responsive to said level sensor is further responsive to a signal indicative of a movement cycle of said rig, and averages said flow-out volume indications over said movement cycle.

19. A system according to claim 18, further comprising:
    d) means for obtaining an indication of flow-in volume to said well bore;
    e) calibration means for calibrating said averaged flow-out volume indications with said flow-in volume indications; and
    f) means responsive to said calibration means for determining an undesirable condition in said well bore.

20. A system according to claim 19, further comprising:
    g) a chimney fixed to said return line; and h) correction sensor means for determining at least one ambient condition in said return line, and for providing signals indicative thereof to said means responsive to level sensor signals, wherein said level sensor means is an ultrasonic pulse echo transceiver supported by said chimney, and said correction sensor means includes a plurality of temperature sensors located at different heights relative to said the surface of said mud flowing in said return line.

21. A system according to claim 20, wherein:

said plurality of temperature sensors comprises a first temperature sensor located in relative close proximity to and above said mud surface, a second temperature sensor located substantially at the junction of said return line and said chimney, and a third temperature sensor located in said chimney in relative close proximity to said transceiver, and said correction sensor further includes a target supported by said chimney or said return line and mounted above said mud surface and at a determinable distance from said transceiver for reflecting a portion of the acoustic energy transmitted by said transceiver back to said transceiver.

22. A system according to claim 12, wherein:

said means (b) is responsive to the location of said target, and further provides an indication of the amount of methane gas in said return line.

23. A method for determining, without obtaining a direct indication of mud velocity from a velocity measurement probe, an indication of the volumetric flow rate of a drilling mud exiting a well bore through an annulus between a drill pipe and the well bore and up to a bell nipple and out to a drilling rig return line said return line having a known physical configuration and being connected to said bell nipple, said drilling mud partially filling said return line, said method comprising:

a) sensing the height of the mud flowing in the return line at a location in said return line where said mud is in supercritical flow, and providing signals indicative thereof;

b) determining flow-out volume of the mud as a function of at least said mud height signals, and the physical configuration of said return line.

24. A method according to claim 23, further comprising:

c) sensing at least one ambient condition in said return line so as to provide speed of sound information in said return line, and providing signals indicative thereof, wherein said step of determining flow-out volume determines flow-out volume as a further function of said at least one ambient condition.

25. A method according to claim 23, further comprising:

c) obtaining an indication of flow-in volume into said well bore;

d) calibrating indications of the determined flow-out volume with indications of the flow-in volume to provide a calibration factor, the product of said flow-out volume and said calibration factor providing a corrected flow-out volume.

26. A method according to claim 25, further comprising:

e) monitoring the differences between said corrected flow-out volume and said flow-in volume over time; and f) identifying an undesirable condition in said well bore by monitoring the rate of change of said monitored differences.

27. A method according to claim 24, further comprising:

d) obtaining an indication of flow-in volume into said well bore;

e) calibrating indications of the determined flow-out volume with indications of the flow-in volume to provide a calibration factor, the product of said flow-out volume and said calibration factor providing a corrected flow-out volume.

28. A method according to claim 27, further comprising:

f) monitoring the differences between said corrected flow-out volume and said flow-in volume over time; and g) identifying an undesirable condition in said well bore by monitoring the rate of change of said monitored differences.

29. A method according to claim 23, further comprising:

c) sensing the angle of said return line, wherein said configuration of said return line includes said angle;

d) sensing the movement of the rig and determining a movement cycle therefrom; and e) averaging flow-out volume indications over said movement cycle.

30. A method according to claim 29, further comprising:

f) obtaining an indication of a flow-in volume to said well bore;

g) calibrating the averaged flow-out volume with the flow-in volume to provide a calibration factor, the product of said average flow-out volume and said calibration factor providing a corrected average flow-out volume.

31. A method according to claim 30, further comprising:

h) monitoring the differences between said corrected flow-out volume and said flow-in volume over time; and i) identifying an undesirable condition in said well bore by monitoring the rate of change of said monitored differences.

32. A method according to claim 31, further comprising:

j) sensing at least one ambient condition in said return line so as to provide speed of sound information in said return line, and providing signals indicative thereof, wherein said step of determining flow-out volume determines flow-out volume as a further function of said at least one ambient condition.

33. A method according to claim 24, further comprising:

d) calculating an indication of the amount of methane gas in said return line, wherein said at least one ambient condition in said return line comprises a temperature profile in said return line.

* * * * *